Patented Dec. 29, 1931

1,838,809

UNITED STATES PATENT OFFICE

THOMAS STANLEY CURTIS, OF HUNTINGTON PARK, AND MICHAEL JOSEPH WALSH, OF CORONADO, CALIFORNIA, ASSIGNORS, BY DIRECT AND MESNE ASSIGNMENTS, TO KELCO COMPANY, OF SAN DIEGO, CALIFORNIA, A CORPORATION OF DELAWARE

CERAMIC COMPOSITION

No Drawing.   Application filed June 26, 1928.   Serial No. 288,531.

Under the conditions prevailing today, it is highly desirable that a ceramic composition be mixed dry for shipment. Such a ceramic composition should contain a plasticizing agent also in dry or powdered form so that it is ready for use upon the addition of water thereto.

The primary object of this invention, therefore, is the provision of a ceramic composition of novel materials, and one which may be shipped dry as above set forth.

A further object of the invention is the provision of a ceramic material to which has been added a plasticizing agent such as will be hereinafter described.

With the end above noted in view, we avail of finely ground kyanite or silica sand to which is added spray dried ammonium alginate powder such as the preparation completely set forth and described in the copending application of Walsh Serial No. 268,799, filed Apr. 9, 1928. Ammonium alginate is the ammonium salt of colloidal organic acid called alginic acid which is derived from any of the brown pigmented kelp and particularly from the species known as *Macrocystic pyrefera*. The process of extraction of the alginic acid is briefly as follows:—

The kelp is subjected to a preliminary leaching with fresh water to remove soluble mineral salts consisting principally of potassium and sodium chlorides. The leached kelp is then digested with a given quantity of sodium carbonate, ground to a fine pulp, boiled and diluted with water and precipitated with calcium chloride solution. The resulting precipitate of calcium alginate is washed and treated with hydrochloric acid. The resulting alginic acid is washed several times with water, the resulting product being alginic acid substantially free from soluble salts. The alginic acid is then neutralized with a calculated amount of ammonia, the resulting product being ammonium alginate. for our purposes the ammonium alginate is diluted with water to a concentration of 3 to 5% solids, sprayed into a chamber with hot air whereby ammonium alignate in a substantially dry powdered form is produced and collected by any of the well known means of air separation such as a cyclone. Suitable means may be availed of to thoroughly intermingle the alginate with the remainder of the materials such as a paddle mixer or if desired, the Muller type pan. The resulting product is capable of having the proper amount of water added thereto at the time of desired use, whereupon a ceramic composition having the desired features of plasticity accompanied by the addition of only a comparatively small amount of water thereto, is provided. This substance is especially valuable in the preparation of high temperature cements and furnace wall coatings which are required to have a high degree of plasticity to facilitate the laying of brick or the troweling upon the surface of a brick wall. By means of the addition of the ammonium alginate powder to the ceramic material as a plasticizing material, a high temperature cement may be composed in its entirety of inert, solid, non-shrinking, and wholly non-plastic particles in powder form, the necessary degree of plasticity being imparted by the gel formed when water is absorbed by the globule of ammonium alginate. In such a cement the only possible shrinking which may occur is due to the coalescence of the particles of non-plastic refractory materials due to the presence of high temperature fluxes this action differing widely from the appreciable thickness of the cementing film of plastic clay. The viscous organic cement resulting from the absorption of water in the ammonium alginate globule is extremely thin and accordingly permits the particles of refractory material to pack very closely together, whereby a structure of low inherent pore volume is produced, thereby lessening the tendency to shrink with increased temperature. The term "gel globule producing substance" is used to denote a substance as hereinbefore set forth, which, on the addition of water thereto, swells and becomes gelatinous to form a plastic agent.

The invention may be put into practice with similar advantages in the manufacture of tile, electric heating appliances, refractories, and other ceramic shapes which must be manufactured in accurate finished sizes. One of the main advantages provided by the invention lies in the elimination of clay from the body composition, making it possible to form such articles with practically 100% of hard, dense, non-shrinking articles, thereby obviating at once the variable element which gives rise to so much trouble evidenced because of the varied shrinkage and plasticity of common clay.

As described in the copending application of Walsh, ammonium alginate is a salt of alginic acid which is a product derived from sea weeds, particularly kelp. While we prefer to employ this substance so as to provide the requisite gel, it is to be clearly understood that other alginate salts derived from alginic acids may well be employed; in fact any marine alginate or marine substance capable of providing the gel globule, is susceptible of use with our invention.

With these and other objects and advantages in view as will in part become apparent and in part be hereinafter described, the invention comprises certain combinations of elements as subsequently described and claimed.

In the preparation of a batch of ceramic materials in accordance with this invention, the proportion of the kyanite, silica sand, or other non-plastic material with ammonium alginate may vary within a comparatively wide range. However, a preferred embodiment of the invention consists of a composition comprising ½% to 1½% of spray dried ammonium alginate with 99½% to 98½% of the kyanite, silica sand, or other ceramic material. The finished product is prepared by adding the ammonium alginate in dry powder in proper proportion as indicated to the dry ceramic batch in any suitable type of mixing machine such as a paddle mixer or a pan of the Muller type. Mixing operations are continued until the alginate salt is thoroughly intermingled with the remainder of the batch, whereupon the mixture is capable of having water added thereto at any appropriate time to provide a batch of the desired plasticity.

Having thus described our invention, what we claim as new and desire to secure by Letters Patent of the United States, is:

1. A ceramic composition of the class described, comprising ceramic materials to which has been added a plasticizing agent in the form of ammonium alginate, the mixture being in dry powdered form.

2. A ceramic composition of the class described, comprising, in combination, kyanite and alginate salt, the mixture being in dry powdered form.

3. A ceramic composition of the class described, comprising substantially 99% kyanite and substantially 1% ammonium alginate in dry powdered form.

4. A ceramic composition of the class described, comprising, in combination, feebly plastic ceramic material to which has been added a marine alginate that functions as a plasticizing agent, the mixture being in dry powdered form.

5. A ceramic composition of the class described, consisting of kyanite and an alginate salt in dry form.

6. A ceramic composition of the class described, consisting of kyanite and ammonium alginate in sufficient proportion to impart to the dry composition the potential property of plasticity to a desired degree when moistened.

7. The process of rendering plastic a ceramic composition, which lies in adding an alginate salt in spray dried form thereto.

8. The process of rendering plastic a ceramic composition, which consists in adding spray dried ammonium alginate to ceramic materials.

9. The process of preparing a ceramic material which lies in treating the same with a marine alginate in dry form to render the composition plastic.

10. The process of preparing a ceramic material which lies in adding to kyanite, spray dried ammonium in proper proportion to impart plasticity to a desired degree to the finished product.

11. A dry ceramic composition of the class described, comprising, a ceramic material to which has been added a plasticizing agent consisting of an alginate in powdered form.

12. The process of preparing ceramic compositions, consisting in adding a substantially dry finely powdered alginate to ceramic materials, mixing same to disseminate the particles of alginate through the mixture; and thereafter, when the composition is to be used, adding water to cause the alginate particles to swell in gel globules and render the composition plastic.

13. The process of preparing ceramic compositions, consisting in adding substantially dry spray dried alginate to ceramic materials, mixing same to disseminate the alginate particles through the mixture; and when the composition is to be used adding sufficient water to cause the alginate particles to swell in gel globules and render the composition plastic.

14. The process of preparing ceramic compositions, which consists in mixing an alginate, in a substantially dried finely powdered form, with non-plastic or feebly plastic ceramic materials; and thereafter, when the composition is to be used, adding water; the addition of the water causing the particles of alginate dispersed throughout the mass of ceramic material to swell to gel globules and render the composition plastic.

15. A ceramic composition of the class specified; comprising a dry mixture of ceramic materials, and dried and powdered alginate adapted, when the mixture is moistened, to render the composition plastic.

16. The process of producing a ceramic composition of the class described; consisting in adding to a dry mixture of ceramic materials, spray dried alginate adapted, when the mixture is moistened, to render the composition plastic.

17. A dry potentially plastic composition of the character described; consisting of a mixture of dry comminuted ceramic material and dry comminuted alginate.

18. The process of producing a dry potentially plastic ceramic composition; consisting in adding a dry comminuted alginate to a dry comminuted ceramic material and mixing same.

In testimony whereof we affix our signatures.

THOMAS STANLEY CURTIS.
MICHAEL JOSEPH WALSH.